(12) United States Patent
Friedrich (10) Patent No.: US 8,111,672 B2
(45) Date of Patent: Feb. 7, 2012

(54) METHOD FOR DATA COMMUNICATION BETWEEN A BASE STATION AND A TRANSPONDER

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 1836 days.

(21) Appl. No.: 11/105,455

(22) Filed: Apr. 14, 2005

(65) Prior Publication Data

US 2005/0231329 A1     Oct. 20, 2005

(30) Foreign Application Priority Data

Apr. 14, 2004  (DE) .................. 10 2004 018 556

(51) Int. Cl.
*H04Q 7/24* (2006.01)
(52) U.S. Cl. ........... 370/338; 370/316; 370/349; 342/51
(58) Field of Classification Search ............ 342/51
See application file for complete search history.

(56) References Cited

U.S. PATENT DOCUMENTS

| | | | |
|---|---|---|---|
| 5,345,231 A | 9/1994 | Koo et al. | |
| 5,818,348 A * | 10/1998 | Walczak et al. | 340/10.3 |
| 6,411,806 B1 * | 6/2002 | Garner et al. | 455/428 |
| 6,424,285 B1 * | 7/2002 | Perdue et al. | 341/176 |
| 2002/0044595 A1 | 4/2002 | Friedrich | |
| 2003/0081582 A1 * | 5/2003 | Jain et al. | 370/338 |
| 2003/0133435 A1 | 7/2003 | Friedrich | |
| 2005/0223280 A1 * | 10/2005 | Bergler et al. | 714/18 |

FOREIGN PATENT DOCUMENTS

| | | |
|---|---|---|
| DE | 100 50 878 A1 | 5/2002 |
| DE | 101 38 217 A1 | 3/2003 |
| DE | 102 04 317 A1 | 8/2003 |
| DE | 102 04 346 A1 | 8/2003 |
| EP | 0 473 569 A2 | 3/1992 |
| GB | 2 330 993 A | 5/1999 |
| GB | 2330993 A | 5/1999 |
| WO | WO 01/74014 A1 | 10/2001 |
| WO | WO-01/74014 A2 | 10/2001 |

OTHER PUBLICATIONS

The Palomar project (PAssive LOng distance Multiple Access UHF RFID system); contributors: VTT, Idesco, Rafsec, Atmel Germany, Atmel Nantes; Deliverable D7, Version V2.1; Status: public. Date of publication: Nov. 1, 2002.

* cited by examiner

*Primary Examiner* — Duc C Ho
(74) *Attorney, Agent, or Firm* — Baker Botts L.L.P.

(57) ABSTRACT

A method for wireless data communication between a base station and at least one transponder by a high-frequency electromagnetic carrier signal, onto which information packets are modulated, wherein each information packet has a header section, a middle section, and a terminating end section, wherein the middle section has a data field, which contains the data necessary for the data communication, wherein at least one additional control field is inserted into the data field by which the structure of the information packets can be variably adjusted within the region of the data field. The invention relates further to a transponder, a base station, and a data communication system.

26 Claims, 5 Drawing Sheets

PRIOR ART

METHOD FOR DATA COMMUNICATION BETWEEN A BASE STATION AND A TRANSPONDER

This nonprovisional application claims priority under 35 U.S.C. §119(a) on German Patent Application No. DE 102004018556.5, which was filed in Germany on Apr. 14, 2004, and which is herein incorporated by reference.

BACKGROUND OF THE INVENTION

1. Field of the Invention

The present invention relates to a method for wireless data communication between a base station and at least one transponder by a high-frequency electromagnetic carrier signal, onto which information packets are modulated. Each information packet has a header section, a middle section, and a terminating end section, wherein the middle section has a data field containing the data necessary for the data communication.

2. Description of the Background Art

The invention falls within the realm of transponder technology and in particular within the field of contactless communication for the purpose of identification. Although it can be used in principle in any communication systems, the present invention and its underlying problem are explained below with reference to so-called RFID communication systems and their application. Here RFID stands for "radio frequency identification." Reference is made on the general background of this RFID technology to the "RFID-Handbuch" (RFID Handbook) of Klaus Finkenzeller, Hanser Verlag, third updated edition, 2002, which is also published in English by John Wile & Sons.

In the case of transponders, an electromagnetic signal transmitted by the base station is received and demodulated by the transponder. Active, semipassive, and passive transponders are differentiated here depending on the design of their energy supply. In contrast to active transponders, passive transponders do not have their own energy supply, so that the energy necessary in the transponder for demodulating and decoding the received electromagnetic signal must be obtained from this electromagnetic signal itself transmitted by the base station. In addition to this unidirectional energy transfer, bidirectional data communication as well typically occurs between the base station and transponder.

The basis for the bidirectional data transmission between the base station and transponder forms a communication protocol, which specifies, in addition to the data information to be transmitted, control information for the data communication.

A generic RFID communication protocol for a known data communication between a base station and transponder is described in the Unexamined German Patent Application DE 101 38 217 A1, which corresponds to U.S. Publication No. 20030133435. Accordingly, an information packet to be transmitted from the base station to a transponder has at least one header section, a middle section, and an end section. The header section defines the number of data to be transmitted and their identification. The middle section contains the data to be transmitted in each case. The end of the information packet is communicated in the end section to the receiver of the data transmitted in each case. The data communication is protected with protection mechanisms, such as, for example, a CRC protection field or parity bits.

A generic RFID method and system for bidirectional data communication is also the subject of the so-called Palomar Project, which was established by the European Commission as part of the so-called IST program. With respect to the content of the Palomar project, reference is made to the related, generally available publication of the European Commission of Jan. 11, 2002, which corresponds substantially to the ISO standard 18000-6.

For further background on bidirectional data communication between a base station and transponder, reference is made further to the Unexamined German Patent Applications DE 102 04 317 A1, DE 100 50 878 A1 (which corresponds to U.S. Publication No. 2002044595), and DE 102 04 346 A1, and the European patent EP 473 569 B1 (which corresponds to U.S. Pat. No. 5,345,231).

In most UHF- and microwave-based RFID systems and/or sensor systems, the data communication between the base station and transponder is initiated first by the base station with the base station transmitting a request signal (command, data request) to the various transponders located within the vicinity of the base station. The transponder(s) participating in the data communication typically respond(s) to this request with a response signal (response), but only if the transponder (s) has (have) received a complete and valid command from the base station. The transponder can now be operated synchronously or asynchronously relative to the base station.

Data communication between the transponder and the base station occurs only after a complete and valid command has been received. If, however, a transponder receives no valid command it sends an error code back to the base station to signal thereby that it has not received a valid command. The transponder, for example, does not receive a valid command if the communication line between the base station and the transponder was disrupted, for example, by overlapping of interfering signals so that the transmission of the command could not be entirely concluded. Another source of error is, for example, faulty demodulation and decoding within the transponder.

In addition, it may also be the case that the transponder is not even designed for decoding commands from the transmitting base station, for example, because of its construction. This transponder would then transmit an error code continuously back to the base station even if there is a trouble-free communication line. The base station, which is now incapable of differentiating whether an error code was transmitted due to a faulty data communication or originated from a transponder not designed for data communication with the base station, would then attempt continually to create a data communication with this transponder, although this is technically impossible. Particularly if the base station would like to communicate with very many transponders, this ties up very many resources of the base station, which can lead very easily to jams in the data communication.

A similar problem arises when the base station has already established data communication with one or more transponders and during the course of this data communication at least one other transponder would like to participate therein, without the base station receiving information on the presence of this additional transponder. These later joining transponders, which are not yet synchronous with the already existing data communication, as a result send constant error codes, which must be processed by the base station. This ties up additional resources of the base station, which can lead very rapidly to jams in data communication particularly in the case of very many additionally joining transponders. On the one hand, there is indeed the need to establish a functioning data communication with all possible transponders that can be accessed by the base station. On the other hand, however, such communication jams between base stations and transponders are to be prevented as much as possible to maintain a high performance of the data communication system.

Existing RFID systems differ in particular through the use of different transponders; in this case, the differences of the different transponder derive substantially from their different function. Transponders differ from each other in particular in the commands and the number of commands they support, i.e., that they can demodulate and decode. In particular, so-called low cost transponders have a limited instruction set, which is hard-wired, for example, or placed in a separate instruction memory specifically provided for this purpose. The functionality of a transponder increases with an increase in the instructions in its instruction set. The increase in functionality, however, goes hand in hand with an increase in transponder circuit costs and thereby an increase in price. For this reason, transponders are equipped with a specified instruction set with a specified size, depending on their intended application. However, it is problematic in this case that this rigidly predetermines the functionality, which leads to a rather limited transponder flexibility.

To realize an increase in flexibility and thereby in the functionality of a transponder, a transponder would have to be provided with very different instruction sets and thereby with many instructions to be able to communicate with very different base stations. This in fact makes it possible to control individually at least the transmission times between the base station and the transponder for the specific commands. Nevertheless, a very large number of commands would have to be provided here, which would have to be stored in a memory specifically provided for this in the transponder or alternatively hard-wired into the transponder. The associated increase in chip surface area of the transponder is also reflected in its higher cost.

SUMMARY OF THE INVENTION

It is therefore an object of the present invention to provide a more flexible data communication between a base station and a transponder. In particular, the data communication is to be adaptable to a specific application. Another object of the present invention is to make the duration of the data communication more flexible. Another object of the present invention is also to increase data security during data communication.

Provided is a method for wireless data communication between a base station and at least one transponder by a high-frequency electromagnetic carrier signal, onto which information packets are modulated, wherein each information packet has a header section, a middle section and a terminating end section, wherein the middle section has a data field, containing the data necessary for the data communication, wherein at least one additional control field is inserted into the data field by which the information packet structure can be variably adjusted in the region of the data field. The invention relates further to a transponder, a base station, and a data communication system.

Also provided is a transponder for data communication with at least one base station, with a transmitting/receiving device for receiving high-frequency carrier signals of at least one base station and for transmitting appropriate response signals to the base station transmitting the carrier signals, with a control device, which controls the data communication with the at least one base station, with a device for inserting a control field, which is designed to insert an additional control field into the information packet structure in the forward link of a data communication.

The invention also provides for a base station for data communication with at least one transponder, with a transmitting/receiving device for transmitting high-frequency carrier signals to the at least one transponder and for receiving the appropriate response signals of the at least one transponder receiving the carrier signals, with a control device, which controls the data communication with the at least one transponder, with a device for inserting a control field, which is designed to insert an additional control field into the information packet structure in the forward link of a data communication according.

A data communication system is also provided, in particular, an RFID data communication system, with at least one transponder of the invention and/or with at least one base station of the invention.

The idea forming the basis of the present invention is to insert an additional control field within the region of the middle section and in particular within the region of the data field. An adaptive control of the protocol structure results by a selective use of one or more control symbols. The introduced additional control field thereby does not interfere with the data transmission protocol. Overall, this results in a significant increase in the functionality of a data communication system in general and a transponder or the corresponding base station in particular. Especially in this case, a desired application can be selectively adjusted to the result desired in each case.

A duration of an information packet can be adjusted variably by insertion of the additional control field, according to an example embodiment.

In another example embodiment, the additional control field has at least a first EOF (End of File) symbol.

In yet another example embodiment of the invention, the additional control field has a jump function so that at least one field, immediately following the additional control field, of the information packet or at least a portion of the fields are skipped and thereby not processed during further data communication.

The end of the jump function and thereby the time of the information packet when data communication is to be continued can be determined by a second EOF symbol.

The data field can contain a long instruction structure with a command field, parameter data field, address data field, and program data field. By the insertion of the additional control field, immediately after a command field, the parameter data field, address data field, and program data field are skipped to create a data field with a short instruction structure, which contains, in addition to the command field, sometimes a parameter data field, address data field, and program data field.

By insertion of the additional control field, at least one additional protection field can be inserted immediately after the additional control field.

A fixed specified number of additional protection fields can be inserted, whereby a single EOF symbol can be provided as the additional control field.

The number of additional protection fields can be adjusted variably. In another feature, an end of the inserted additional protection field having a variable length is defined by the insertion of another EOF symbol. Typically, but not necessarily, the additional EOF symbol is formed by the first symbol of the end section.

The additional control field in a forward link of a data communication is inserted into the structure of the information packet, the data field in the forward link having at least one command field. The additional control field can be inserted immediately after the command field.

The additional control field in a return link of a data communication can be inserted into the information packet structure, the data field in the return link having at least one read-data field. The control field can be inserted into and/or immediately after the read-data field.

The additional information field can be inserted by the base station into a data communication.

Also, a transponder, whose protocol does not support the function of the additional control field and thereby does not recognize its content, ignores the content of the additional control field.

The transponder, whose protocol does not support the function of the additional control field and thereby does not recognize its content, no longer participates in further data communication with the base station.

In a further example embodiment, another command level can be inserted into the structure of the middle section following the additional control field, wherein the additional command level has additional instructions in addition to the instructions provided in a command field of a data section.

An additional information field can be inserted into the structure of the middle section following the additional control field, wherein information on the employed modulation type, additional parameter data, additional address data, additional program data, frequency information, and/or country-specific information for the data retransmission in the return link and/or clock information for control of a clock generator of a transponder participating in the data communication are provided in the additional information field.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the figures of the drawing, the same or functionally identical elements, data, and signals, if not specified otherwise, are provided with the same reference characters. The presentations in FIGS. 1-4, 6, 8, and 9 refer in each case to a time sequence of a specific data communication in relation to the information packet.

The data communication between a base station and a transponder defines a channel, which is designated below as the forward link VL (or downlink). Conversely, the data communication from the transponder back to the base station designates a channel, which is generally designated as a return link RL (or uplink). In addition to the data communication in the return link RL, in backscattering-based transponders, data communication also occurs between transponder and base station in which a transmitted signal is scattered back to the sender with use of a backscatter cross section of the antenna of the receiver. This method is also generally known as the backscatter method. This data communication with the backscatter technique can be used in both the forward and return link.

The data transmission typically occurs by an amplitude-modulated carrier wave, which is transmitted on the base station side and is returned by the transponder. The data modulated onto the carrier wave are generated by pulse pause modulation of the carrier signal in that the transmitter of the base station, for certain time spans, turns an electromagnetic field on or off for the carrier signal. In the transponder, thus on the input side, a voltage signal is generated that is derived from the field strength of the carrier signal, which has voltage dips, is also generally called "notches." The data information now occurs within the time span between two such voltage dips. This time span now includes in each case a data symbol or briefly a symbol. The field gaps during which the transmitter of the base station is turned off and/or no electric magnetic carrier signal is transmitted, thus to a certain extent forms a separator between two successive symbols. The significant value of a data symbol is also determined from the time span during which the electromagnetic field is turned on and thus the carrier signal has a nominal amplitude. A symbol can now contain a digital code, for example, a logic zero ("0") or a logic one ("1"), or additional information, such as, for example, an EOF symbol.

Figure 1:
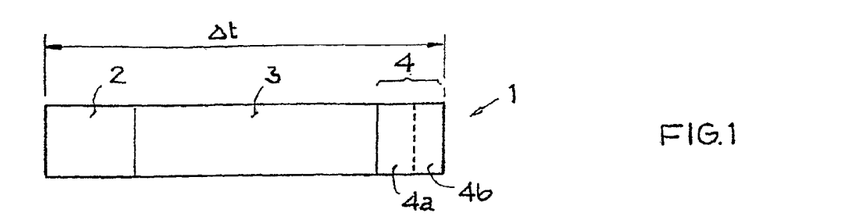
FIG. 1 illustrates a basic structure of an information packet for data communication between a base station and transponder.

FIG. 1 shows a basic structure of an information packet 1, as it is used for data communication between a base station and a transponder and as is known, for example, from the aforementioned Unexamined German Patent Application DE 101 38 217 A1, which, as noted above, corresponds to U.S Publication No. 20030133435, and which is incorporated herein by reference.

The information packet 1 has a header section 2, a middle section 3, and an end section 4.

The number of data symbols to be transmitted and their identification are defined in the header section 2. This is necessary to be able to establish the precise position where a specific field begins within the middle section 3 or the end section 4. This need results from the fact that the duration $\Delta t$ of an information packet 1 in general and of the individual fields 2-4 in particular is not fixedly defined and is constant to the greatest possible extent, as is the case in many time slotbased data transmission methods. Rather, the duration Δt and thereby the information transmitted within an information packet 1 can vary more or less greatly depending on the application. The data to be transmitted in the middle section 3 are coded with the identification within header section 2. In particular, the header section 2 specifies reference times that are used for further data transmission in the middle section 3 or data field 5. The speed of the data communication between the base station and transponder is also established by the header section 2, for example, by a frequency of a free-running oscillator in the transponder. Moreover, in a very advantageous embodiment, the header section 2 can also contain control information for the fields of the middle section 3 and the end section 4, which follow the header section 2.

In this regard, reference is also made to the Unexamined German Patent Application DE 101 38 217 A1, by means of the header section of a data protocol, by which the number of symbols used for coding in the data region and their identification is defined.

The content of the end section 4 indicates to the specific receiver of the transmitted information packet 1 the end of the packet. In the case of the aforementioned Palomar system, an EOT end section 4 (EOT=end of transmission) is provided, which has precisely two EOF symbols 4a, 4b (EOF=end of file).

The middle section 3 generally includes a data field 5 and a protection field 6 immediately following the data field 5. Coded data symbols are transferred in the middle section 3. The most diverse data structures can be provided here depending on the desired application. This is described by means of FIGS. 2(A) and 2(B) with reference to two different structures (long command, short command) of an information packet 1 in the forward link VL.

Figure 2A:
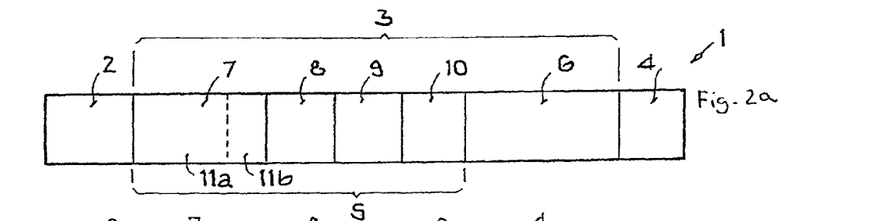
FIGS. 2a and 2b illustrate the structure of an information packet in the case of a long command (A) and in the case of a short command (B)
Figure 2B:
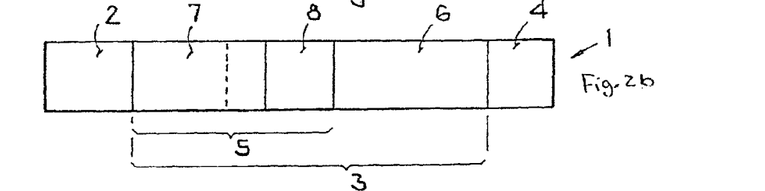

The middle section 3 contains a data field 5 and a protection field 6 immediately following said data field 5.

In the present exemplary embodiment in FIGS. 2(A) and 2(B), the protection field 6 arranged after the data field 5 is designed as a so-called CRC protection field 6 (CRC=Cyclic Redundancy Check). The bit width of the CRC field 6 depends in particular on the bit width of the data to be transmitted in the data field 5 and/or the application determined by the user in each case. Depending on the application, therefore, a CRC protection field 6 can be provided, which has a more or less wide bit width according to the desired protection redundancy. Instead of the embodiment as a CRC protection field 6, the protection field 6 can also be occupied by so-called parity bits. In particular, a very extensive CRC protection field 6 can therefore be provided during the transmission of protection-relevant data between the base station and the transponder. The CRC protection field 6 can have, for example, 16, 32, or even 64 bits depending on the data in the data field 5. The CRC protection field 6 can also have a number of protection bits corresponding to the number of bits in the data field 5.

In the case of the Palomar system, the information packet 1 is divided into those that contain long commands and thereby long addresses (A) and those that contain short commands and therefore short addresses (B).

FIG. 2(A) shows the structure of an information packet 1 in the case of a long command. Here, the data field 5 in a time sequence successively contains a command field 7, a parameter field 8, an address field 9, and a program data field 10. The content of the fields 7-10 depends on the specifically desired application and in particular on the volume of data symbols to be transmitted by the specific information packet 1.

In the case of an information packet 1, which has short commands, as shown in FIG. 2(B), the data field 5 can only have one command field 7 and a parameter field 8 placed thereafter.

In a typical embodiment, command field 7, for example, has six-bit-wide commands 11a (instructions), which are followed by two protection bits 11b. The separation between the command bits 11a and the protection bits 11b is shown by the dashed line in FIG. 2.

Command field 7, for example, for data communication between the base station and the transponder can contain conventional instructions, such as, for example, write instructions, read instructions, programming instructions, interrupt instructions, arbitration instructions, jump instructions, etc. The two protection bits 11b placed after the command field 7 can be used for verification of the specifically transmitted instructions.

The parameter field 8 placed after command field 7 can have information on which commands (long or short instructions) are to be used, which addressing modes (direct, indirect, or symbolic addressing) are to be used, and which type of modulation (3phase1, FSK, FM0, NRZE, etc.) can be used. Parameter field 8 has a corresponding bit width depending on the application and desired functionality.

Address field 9 following the parameter field 8 specifies the appropriate addresses of the data to be read from the memory or to be written to the memory. A block address can also be provided here instead of a bit address.

The program data field 10 can contain the actual data that are to be saved in the memory (write-data) or read from it (read-data).

It is therefore evident that the duration Δt of a specific information packet 1 depends more or less greatly on the data symbols to be transmitted, i.e., on the commands, addresses, CRC protection data, etc. Without further measures, this duration Δt of an information packet 1 is fixedly specified.

The structure of an information packet 1 in the return link RL corresponds substantially to that of the forward link VL or is even occasionally identical to it.

Figure 3:
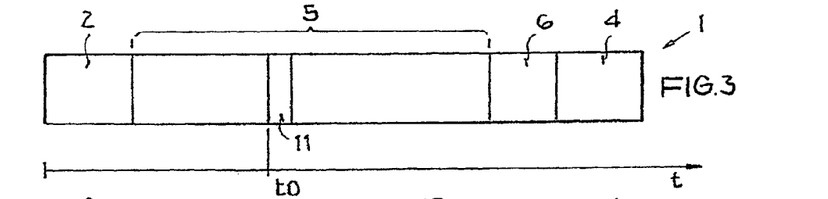
FIG. 3 illustrates the structure of an information packet in a forward link of a data communication, according to an example embodiment.

FIG. 3 shows a structure of an information packet according to an example embodiment of the invention in the forward link of a data communication.

According to this example embodiment, an additional control field 11 is inserted into the structure of an information packet 1, namely, in the region of the data field 5. It is assumed in the present exemplary embodiment that the inserted additional control field 11 is a single EOF symbol. However, it would also be conceivable for control field 11 to have more than one symbol, which also does not need to be formed solely as EOF symbols. The additional control field 11 can be inserted in the forward link VL and additionally or alternatively also in the return link RL of a data communication.

The insertion of the control field 11 can variably adjust the length and thereby the duration Δt of an information packet 1 within certain limits. This variable adjustability of the length of the information packet 1 will be described in further detail below with reference to FIGS. 4-9.

Figure 4:
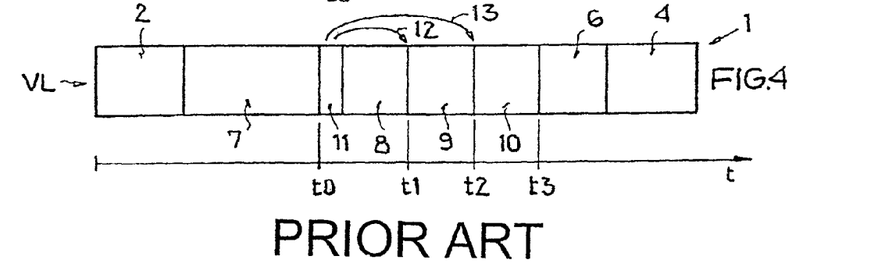
FIG. 4 shows an example embodiment of an information packet structure expanded by insertion of a control field according to the invention.

FIG. 4 shows a first example embodiment of an information packet structure expanded by insertion of a control field 11 according to the invention.

In this example embodiment, the control field 11 can be inserted in the forward link VL and preferably after command field 7. The insertion of the control field 11 causes at least one of the fields 8-10, following the command field 7, to be skipped during the data communication. The control field 11 can be inserted immediately after the command field 7, i.e., at time t0. Depending on the desired application and/or the instruction contained in the command field 7, it can now be provided that only parameter field 8 is skipped, which is indicated by the arrow 12. The transmission of the data is therefore continued after the skipping of the parameter field 8 at time t1 and thereby at the beginning of address field 9. It would also be conceivable after insertion of the control field 11 to skip parameter field 8 and also the subsequent address field 9, which is indicated by the arrow 13. The data communication would then jump immediately to the beginning of the program data field 10 and there continue transmission of the data.

In FIG. 4, the control field 11 is inserted immediately after command field 7. Insertion of this control field 11, however, at any site within the data field 5 would also be conceivable, i.e., also after the parameter field 8, after the address field 9, after the program data field 10, or also within one of these fields 8-10. The skips 12, 13 after insertion of the control field 11 also need not be designed such that the further transmission of data is continued each time at the beginning of a subsequent field 8-10, but can also be continued at any specified site within one of these fields 8-10.

Figure 5:
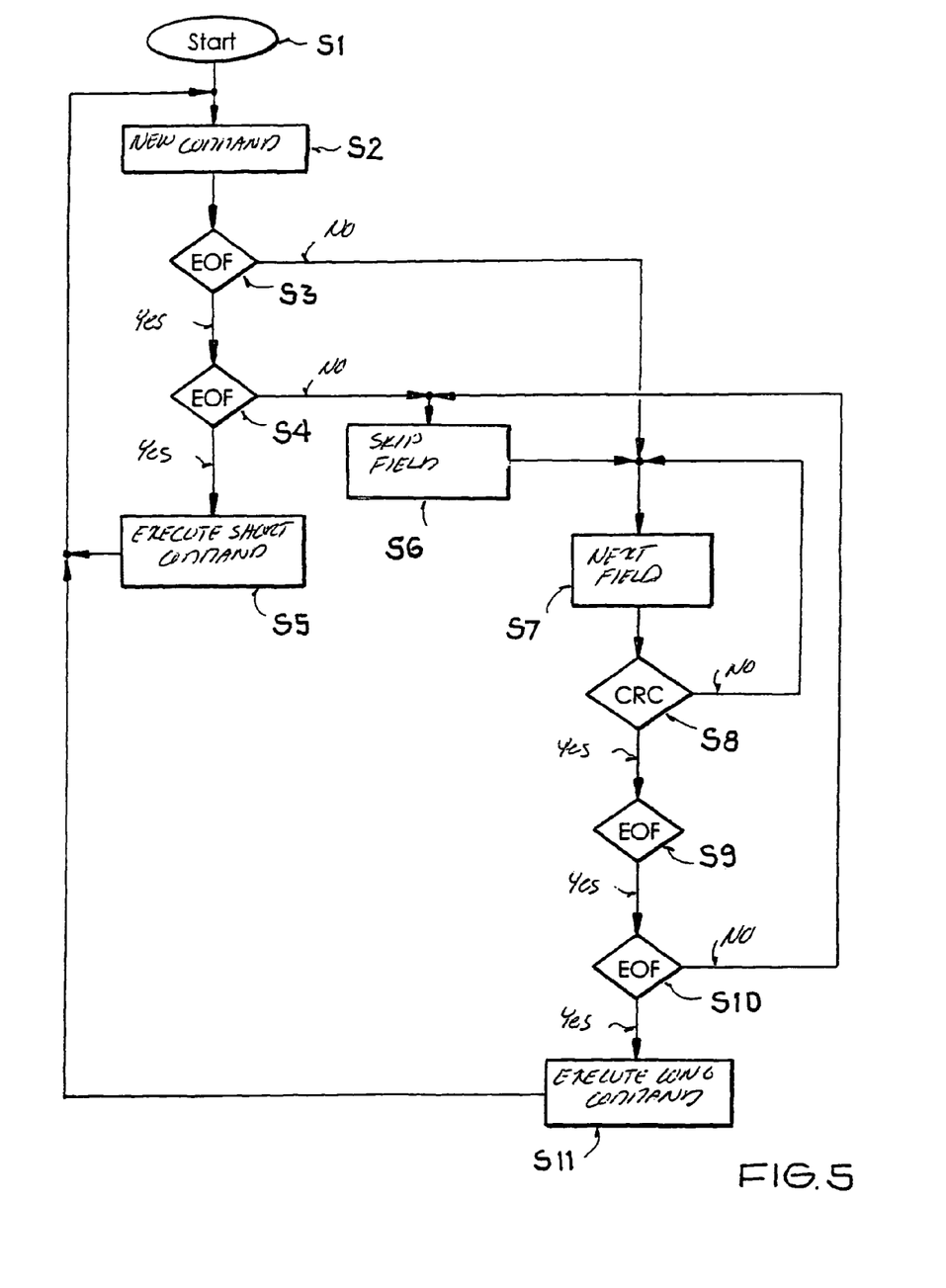
FIG. 5 is a flow chart describing the insertion of a control field according to the invention, as shown in FIG. 4.

FIG. 5 shows a flowchart in the transponder in the case of the control symbol 11 being inserted according in the forward link VL according to FIG. 4, which entails the skipping of one or several subsequent fields in the region of data field 4.

The flowchart in FIG. 5 here differentiates the constellation "long command" and "short command." In the case of a short command, as is well known, two EOF symbols 4a, 4b, which together form the EOT end section 4, follow immediately after the command field 7. In the flowchart in FIG. 5, this path is designated as steps S1-S5. After the start (S1) of the data communication, the transponder via the forward link VL initially receives a first command sequence (S2), which is a component of the command field 7. If the transponder immediately thereafter receives a first EOF symbol (S3), it checks whether this first EOF symbol is followed by a second EOF symbol (S4). If this is the case, the transponder concludes that a short command is present. The transponder now executes the appropriate command (S5), for example, a read or write command. The transponder is then ready to receive the next command sequence (S2) and thereby the next information packet.

If another EOF symbol (S4) does not follow the first EOF symbol (S3), the transponder then interprets the first EOF symbol from step S3 as a control symbol being inserted. As a result, the transponder skips (S6) at least one subsequent field in the data field. The field (S7) following the skipped field is then picked up. It is checked further whether this field is followed by a CRC protection field 6 (S8). If this is not the case, the process continues in step S7 and the field following the picked up field is received. If the received field in step S7 is followed by a CRC protection field 6 in step S8, it is then checked whether this CRC protection field 6 is followed by two EOF symbols (S9, S10). If these two EOF symbols are present in steps S9, S10, the presence of a long command is concluded. This long command is then executed in step S11. The process can then be continued with step S2.

If no second EOF symbol is present in step S10, at least one field within the data field is again skipped with step S6 according to the invention.

If no EOF symbol S3 follows after step S2, the presence of a long command—without the insertion of a control field 11 according to invention—is concluded. The method is then continued with step S7.

The process sequence of the invention in FIG. 5 is thereby characterized by a jump functionality in step S6, which is present particularly in the case of a long command. This possibility of skipping at least parts of the data field 4 can be controlled in a very simple manner by insertion of a single control symbol 11, in the present case a single EOF symbol S3, in the region of the data field.

In addition, the sequence course of the invention in FIG. 5 can also be supplemented and/or modified. Thus, the path (sequence S1-S5) need not be provided to be able to differentiate between a short and long command. This functionality of a short command can be realized very advantageously also by the jump function of step S6. In this case, the same sequence would be used for a long and short command, whereby the jump function is used to differentiate long and short commands (not shown in FIG. 5). For example, control field 11 representing the jump function can be inserted after the command field 7 of a short command in order to jump directly to the CRC protection field 6, so that in this manner a long command is reduced overall to a short command.

Moreover, it would also be conceivable to insert another EOF control symbol between process step S7 and process step S8, by which at least parts of the CRC protection field 6 can be skipped.

The original duration Δt of an information packet 1 can be considerably shortened by the jumping of at least parts of the data field 4 or by ignoring at least some fields of the data field 4. Overall, this means that with the insertion of an EOF control field 11 in the forward link VL of a data communication, this can be significantly shortened.

In the present exemplary embodiment of FIGS. 4 and 5, the EOF control symbol 11, which is used for skipping at least parts of data field 4 and thereby shortening the duration Δt of an information packet, is inserted only into the forward link VL. It would also be conceivable, however, to insert this EOF control symbol also into the return link RL for the same purpose.

Figure 6:
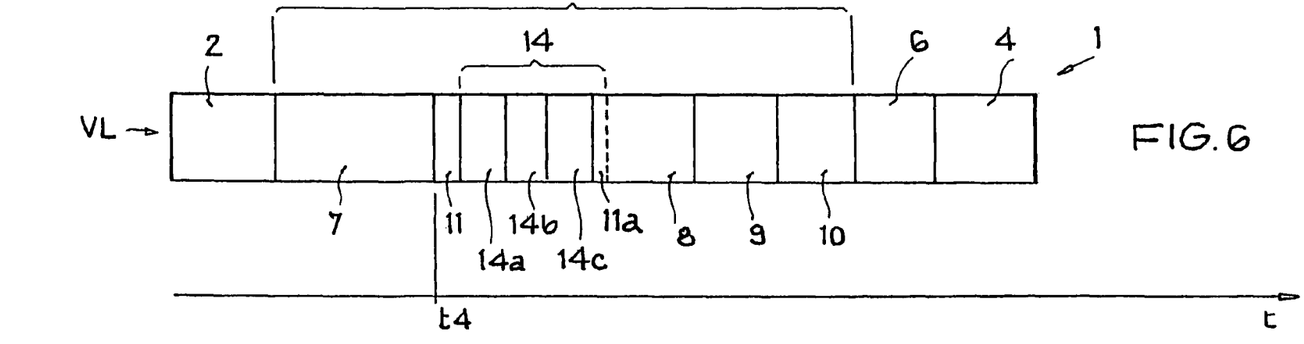
FIG. 6 is another example embodiment of an information packet structure expanded by insertion of a control field according to the invention.

FIG. 6 shows a second exemplary embodiment of an information packet structure expanded by insertion of a control field 11 according to the invention.

There, according to the invention at time t4 and thereby immediately after the command field 7, an EOF control symbol 11 is inserted in the forward link VL of an information packet 1. In contrast to the exemplary embodiment in FIG. 4, here through insertion of the control field 11 at least one additional CRC protection field 14 is inserted immediately after the command field 7 or, any other field. In the present exemplary embodiment, due to the EOF control symbol 11, a total of three CRC protection fields 14a-14c are inserted after the command field 7 and before the following parameter field 8.

Additive protection is thus achieved by insertion of this EOF control symbol 11—additive in the sense that at least another protection field 14 is used in addition to the already present CRC protection field 6.

In an initial embodiment, it was provided that during insertion of such an EOF control symbol 11a fixed specified number of CRC protection fields 14 are inserted. It is sufficient in this case if for the control field 11, only a single EOF control symbol 11 is inserted, which signals the start where the additional CRC protection field(s) 14 is (are) to be inserted. The end of the CRC protection field 14 and thereby the beginning of the following field is then specified based on the fixed and thereby known length of the additional inserted CRC protection fields 14.

In a second example embodiment, it can also be provided that the length of the inserted CRC protection field 14 and thereby the number of the individual CRC protection fields 14a-14c is variably adjustable to the specific circumstances—for example, the bit length of the specifically prefixed command field 7 or data field 5. In this case, the end of the inserted CRC protection field 14 is characterized by the insertion of another EOF control symbol 11a, which, for example, is also a component of the control field 11. This variant is shown as a dashed line in the figure. In this manner, a CRC protection field 14, adaptively adjustable in regard to its length, can be inserted at any site within data field 5 at the beginning and end at any time controlled by the two EOF controls symbol 11, 11a.

In another advantageous embodiment, if the data transmission application and its protocol allow, the first EOF symbol 4a of the EOT end section 4 to form as it were the additional EOF control symbol 11a mentioned in the previous paragraph (not shown in the figures).

Figure 7:
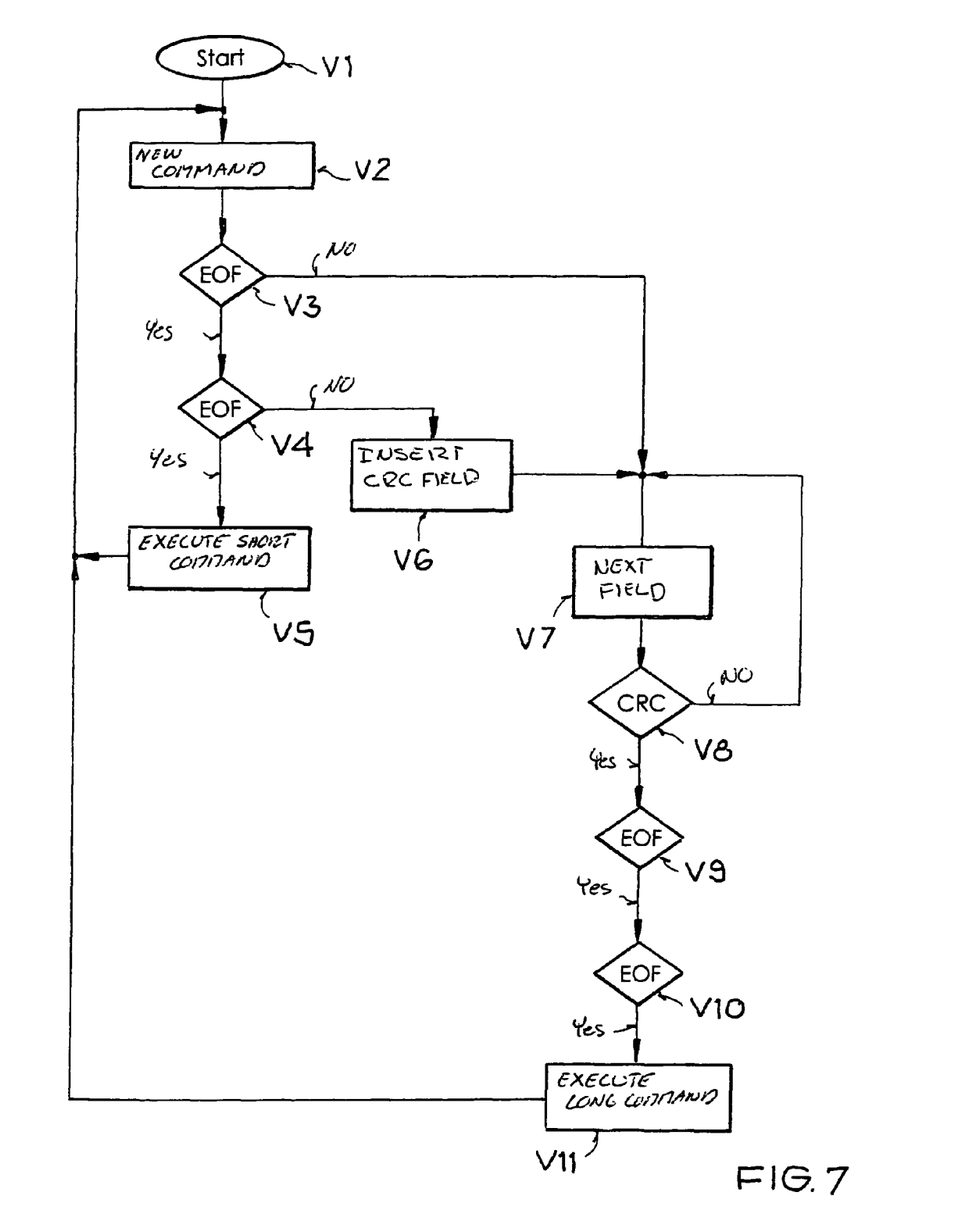
FIG. 7 is a flow chart showing the insertion of a control field according to the invention, as shown in FIG. 6.

FIG. 7 shows the corresponding flowchart in the transponder in the case of the control symbol 11 inserted according to the invention in the forward link VL according to FIG. 6, by which additional CRC protection fields 14 are inserted in the region of the data field 4.

Process steps V1-V5 for identifying a short command correspond to the respective process steps S1-S5 in FIG. 5. Moreover, process steps V1-V3 and V7-V11 for identifying and executing a long command also correspond to the corresponding process steps S1-S3 and S7-S11 in FIG. 5.

According to the invention, in FIG. 7, if after process step V3 no further EOF symbol (V4) is present, in process step V6 at least one additional CRC protection field is inserted in the region of the data field.

Through the insertion of at least one additional CRC protection field, the actual duration Δt of an information packet is in fact increased by the length of the inserted protection field. Nevertheless, the security of the data communication is significantly increased by this, which is of particular advantage especially in the case of transmission of large volumes of data, because in this case the present but perhaps too small CRC protection field at the end of the middle section of an information packet is not sufficient. Overall, this means that additive security can be provided thereby with the insertion of an additional control field in the forward link of a data communication.

Figure 8:
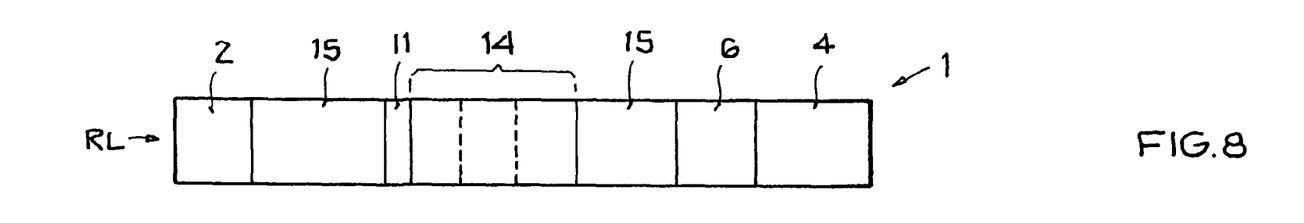
FIG. 8 is yet another example embodiment in which a control field in inserted into the structure of an information packet in the return link according to the invention.

FIG. 8 shows a third exemplary embodiment of an information packet structure expanded by insertion of a control field 11 according to the invention.

The middle section 3 or the corresponding data field 5 of an information packet 1 in the return link RL here have a read-data field 15, in which read data, which, for example, were requested due to a read instruction of the base station, are read out of the memory of the transponder and transmitted to the base station. The control field 11 is inserted here into or after the read-data field 15. The control field 11 here, as in the exemplary embodiment in FIG. 6, has the result that one or several immediately successive CRC protection fields 14 are inserted immediately after the inserted control field 11 in the read-data field 15.

Figure 9:
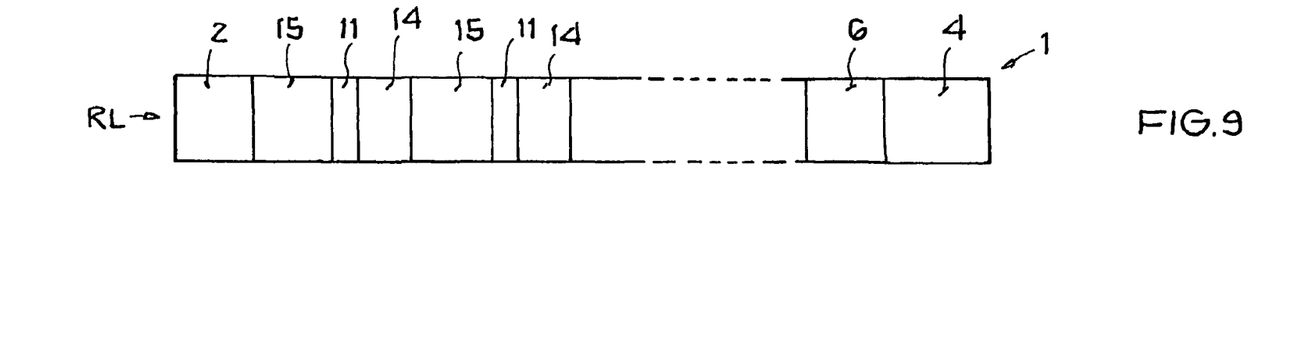
FIG. 9 illustrates another example embodiment in which a control field is inserted into the information packet structure in the return link according to the invention.

FIG. 9 shows a fourth example embodiment of an information packet structure expanded by insertion of the control field 11 according to the invention.

In contrast to the embodiment in FIG. 8, several control fields 11 are arranged within the return link RL within the read-data field 15. These control fields 11 are inserted at intervals, specifiable in each case, in the read-data field 15 and have the effect that in each case one or more CRC protection fields 14 are inserted immediately after a respective control field 11.

This method has an advantage in the transmission of large volumes of data from a transponder to a base station specifically requesting these data. Here, a simple read instruction is sufficient to read out a portion or the entire memory of the transponder. Because, however, very large volumes of data are read out here and transmitted, suitable security must also be present. This is no longer assured, however, with very large volumes of data by the CRC protection field 6 present in any event. Through the insertion of additional CRC protection fields 14 at more or less regular intervals, additive security is provided here in a very elegant manner, which assures sufficient data security also with very large volumes of read-out data.

Especially preferably, this form of insertion of CRC protection fields 14 can be used in association with the so-called auto increment instructions and/or auto decrement instructions. In these auto increment instructions and/or auto decrement instructions, the address of the memory, which is to be accessed to read a datum, is increased and/or reduced in each case by a preset value, for example, by 1, 2, 4, etc. In this manner, after an initial address where the read-out process is to start, the entire memory and/or very large sections thereof can be read out without the specific data field length and the specific address for the majority of the read-out data having to be identified individually in each case. This enables a very effective and very rapid reading out of a large volume of data from the memory. In this regard, a CRC protection field 14 can be inserted advantageously at any sites of the read-out data in each case using the method of the invention to assure the required data security during the data communication.

The method of the invention is therefore suitable in a very advantageous manner, for example, for reading out a memory of the transponder, for example, for the purpose of measuring or evaluation.

Figure 10:
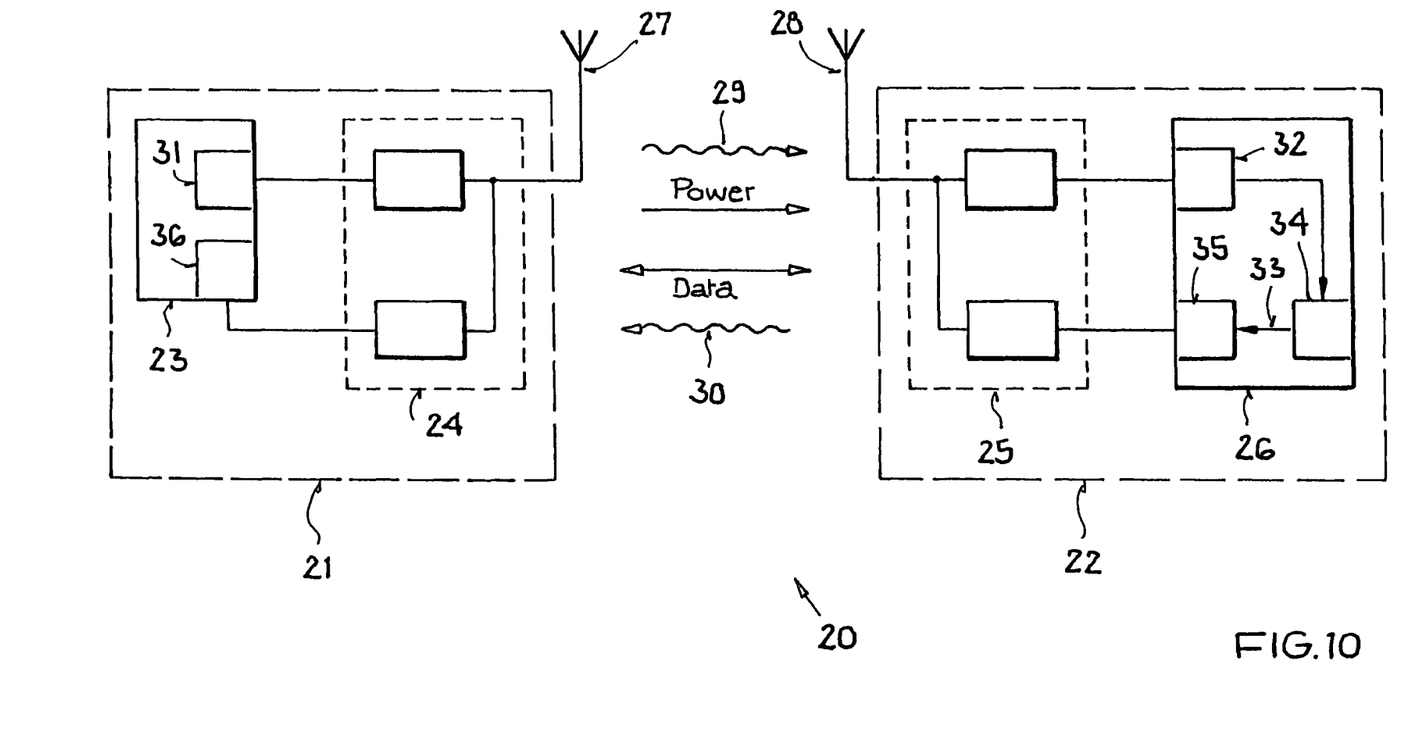
FIG. 10 is a block diagram of an RFID communication system containing a base station and at least one transponder.

FIG. 10 shows a block diagram of an RFID communication system having a base station and at least one transponder for carrying out the method of the invention.

The communication system designated with reference character 20 has a base station 21 and a transponder 22. The base station 21 and the transponder 22 have a communication link here. The communication system is designed as a so-called master-slave communication system, the base station functioning as the master and the transponder(s) each as slaves. The base station 21 has a control device 23 and a transmitting/receiving device 24 (transceiver). In a similar way, transponder 22 has a transmitting/receiving device 25 and a control device 26. The transmitting/receiving device 24 of the base station 21 is designed to send high-frequency carrier signals 29 via antenna 27 to an antenna 28 of the transponder 22. In a similar way, the transmitting/receiving device 25 of transponder 22 is designed to transmit the appropriate response signals 30 back to base station 21 in full duplex or half duplex operation in response to the transmitted signals 29. The data communication is controlled in each case by means of control devices 23 and/or 26.

The data communication is further designed so that bidirectional transmission of data occurs between the base station 21 and the transponder 22, whereby the two directions of the data transmission are specified by the forward link VL and/or the return link RL. However, the transponder 22 can be supplied with power unidirectionally via the carrier signals 29.

To carry out the method of the invention, the base station 21 now has a device 31 for inserting a control field 11, which provides for the insertion of an additional control field 11 into the structure of an information packet 1 in the forward link VL—according to FIGS. 4-7. This device 31 is advantageously a component of the control device 23.

The transponder 22 can have an evaluation device 32, which, for example, is a component of the transmitting/receiving device 27 on the transponder side or the control device 26 on the transponder side. The evaluation device 32 evaluates the signals 29 transmitted on the base station side via the forward link VL and recognizes a control field 11 inserted according to invention. Depending on the application, one or more fields of data field 5 are now skipped here according to the method described with reference to FIGS. 4 and 5.

In a similar way, now additionally or alternatively, the transponder 22 can also have a device 35 for carrying out the method of the invention, which provides for an insertion according to the invention of an additional control field 11 into the structure of an information packet 1 in the return link RL. Upon a request from the base station 21, for example, data 33 requested by the base station 21 via a request signal 29 are read out from a memory 34 of the transponder 22 and provided for transmission to the base station 21. According to a method described in FIG. 8 or 9, the device 35 now inserts additional control fields 11 and thereby additional CRC protection fields 14 into the structure of a response signal 30 transmitted back to base station 21.

Base station 21 as well has an evaluation device 36, which, for example, can be a component of the transmitting/receiving device 24 or control device 23 on the base station side. The evaluation device 36 evaluates signals 30 transmitted via the return link on the transponder side. During this evaluation, the evaluation device 32 recognizes an additional control field 11 inserted according to the invention and thereby the subsequent additional CRC protection fields 14.

Although the present invention was described above with reference to a preferred exemplary embodiment, it is not limited thereto but can be modified in many ways.

The invention is not particularly limited to RFID systems alone, but of course can also be expanded, for example, to item identification. The individual items frequently need not be uniquely identified. It is often also sufficient here that a presence, for example, of a defective item can be ruled out. This is also usually called "non-unique" identification. During operation of the transponder in this regard, it has the function of a remote sensor. The invention therefore also refers explicitly to such transponders designed as sensors, in which a communication for reading out and writing of data of a data carrier or sensor is undertaken. A temperature sensor, pressure sensor, or the like are mentioned as examples of such so-called remote sensor application.

The invention is also not limited exclusively to a data communication system according to the aforementioned Palomar system, but can be used advantageously in any generic data communication system.

The data communication system and method described above were described with the help of the "reader talks first" principle. The "tag talks first" principle in which the base station first waits for a request from a transponder would naturally also be conceivable. Nevertheless, this principle has a poor reaction time, so that primarily the "reader talks first" principle is employed preferably in modern so-called "long range" data communication systems.

In the exemplary embodiments of FIGS. 4, 6, 8, and 9, it was assumed in each case that the content of the inserted additional control field has a single symbol, namely, an EOF symbol. It would naturally also be conceivable that two or more symbols are provided for the control field here. It would be conceivable further to provide several control fields, which are inserted at different sites into the information packet, instead of only one control field. With suitable agreement of these control fields among each other, a highly flexible data communication is provided thereby, which can be adapted at any time flexibly to the specific data communication circumstances.

The components described with the aid of FIGS. 3-9 of the method of the invention can, of course, also be combined with each other. For example, it would also be conceivable if at least a subsequent field is skipped with a first control field and at least one CRC protection field is inserted with another control field within the same information packet. It would be further conceivable, if, for example, in the forward link at least one subsequent field is skipped by means of a first control field and in the return link one or more CRC protection fields are inserted by means of further control fields. As a result, in the forward link, which presumably concerns rapid data communication, the duration of this data communication can be significantly shortened. In the return link, which in many applications concerns the reading out and transmission of a large volume of data, a largely error-free and effective data transmission can be assured here.

In an also very advantageous embodiment, the invention with insertion of an additional control field is not necessarily limited only to a jump function or the insertion of additional CRC protection fields. It would also be conceivable here to insert other commands with the additional control field, so that here as well an additional control level beyond the already present command field can be created. Generally, any fields can be inserted into the structure of an information packet with the additional control field, although at present the jump function and the insertion of additional CRC protection fields represent the most effective applications.

FIG. 10 presents the structure of the base station and the transponder intentionally in a very simplified way for the sake of clarity. It goes without saying that functional units necessary for data communication between a base station and transponder, such as a demodulator, power supply, synchronization device, decoder, and the like, are of course also present in these units.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for wireless data communication between a base station and at least one transponder via a high-frequency electromagnetic carrier signal, the method comprising:
   modulating information packets onto the high-frequency electromagnetic carrier signal, each information packet including a header section, a middle section, and a terminating end section, the middle section having a data field containing data necessary for the data communication; and
   inserting at least one additional control field into the data field, by which a structure of each information packet transmitted between the at least one transponder and the base station can be variably adjusted in the region of the data field.

2. The method according to claim 1, wherein, by insertion of the additional control field a duration of an information packet can be variably adjusted.

3. The method according to claim 1, wherein the additional control field has at least a first EOF symbol.

4. The method according to claim 1, wherein the additional control field has a jump function so that at least one field, immediately following the additional control field of the information packet or at least a portion of the at least one field is skipped and thereby not processed during the data communication.

5. The method according to claim 4, wherein an end of a jump function and thereby a time of the information packet when the data communication is to be continued is determined by a second EOF symbol.

6. The method according to claim 1, wherein the data field contains a long instruction structure with a command field, a parameter data field, an address data field, and a program data field, and wherein, by insertion of the additional control field immediately after a command field, the parameter data field, the address data field, and the program data field are skipped to create a data field having a short instruction structure, which, in addition to the command field, partially contains the parameter data field, the address data field and the program data field.

7. The method according to claim 1, wherein, by insertion of the additional control field, at least one additional protection field is inserted immediately after the additional control field.

8. The method according to claim 7, wherein a specified number of additional protection fields are inserted.

9. The method according to claim 8, wherein a single EOF symbol is provided as the additional control field.

10. The method according to claim 7, wherein a number of additional protection fields can be adjusted variably.

11. The method according to claim 10, wherein an end of the inserted additional protection field is defined by insertion of a second EOF symbol.

12. The method according to claim 11, wherein the second EOF symbol is formed by a first symbol of the end section.

13. The method according to claim 1, wherein the additional control field, in a forward link of a data communication, is inserted into the information packet, and wherein the data field in the forward link has at least one command field.

14. The method according to claim 13, wherein the additional control field is inserted immediately after the command field.

15. The method according to claim 1, wherein the additional control field, in a return link, is inserted into the information packet, and wherein the data field in the return link has at least one read-data field.

16. The method according to claim 15, wherein the control field is inserted into and/or immediately after the read-data field.

17. The method according to claim 1, wherein the additional information field is inserted by the base station.

18. The method according to claim 1, wherein the transponder, whose protocol does not support the function of the additional control field and thereby does not recognize its content, ignores the content of the additional control field.

19. The method according to claim 1, wherein the transponder, whose protocol does not support the function of the additional control field and thereby does not recognize its content, no longer participates in further data communication with the base station.

20. The method according to claim 1, wherein the data section has a command field and wherein an additional command field is inserted into the middle section following the additional control field, and wherein the additional command field has additional instructions in addition to the instructions provided in the command field of the data section.

21. The method according to claim 1, wherein, following the additional control field, an additional information field is inserted into the middle section, and wherein information on an employed modulation type, an additional parameter data, an additional address data, an additional program data, a frequency information, and/or a country-specific information for data retransmission in the return link and/or clock information to control a clock generator of a transponder participating in the data communication are provided in the additional information field.

22. A transponder for data communication with at least one base station, the transponder comprising:
a transmitting/receiving device for receiving a high-frequency carrier signal from the at least one base station and for transmitting an appropriate response signal to the base station including an information packet including a header section, a middle section having a data field containing data necessary for the data communication, and a terminating end section;
a control device, which controls the data communication with the at least one base station; and
a device for inserting an additional control field into said data field of said information packet in a return link of the data communication.

23. A base station for data communication with at least one transponder, the base station comprising:
a transmitting/receiving device for transmitting a high-frequency carrier signal station including an information packet including a header section, a middle section having a data field containing data necessary for the data communication, and a terminating end section to the at least one transponder and for receiving an appropriate response signal of the at least one transponder receiving the carrier signal;
a control device, which controls the data communication with the at least one transponder; and
a device for inserting an additional control field into said data field of said information packet in a forward link of the data communication.

24. A data communication system, comprising at least one transponder and at least one base station, both the transponder and base station comprising:
a transmitting/receiving device for transmitting a high-frequency carrier signal and for receiving a response signal each of said carrier signal and said response signal including an information packet including a header section, a middle section having a data field containing data necessary for data communication, and a terminating end section;
a control device, which controls the data communication with either the transponder or the base station; and
a device for inserting an additional control field into said data field of said information packet in the data communication, wherein the additional control field is inserted in a return link by the transponder and in a forward link by the base station.

25. The data communication system according to claim 24, wherein the at least one base station and/or the at least one transponder has an evaluation device, which evaluates a received signal and recognizes an additional control field that is inserted into the signal.

26. The data communication system according to claim 24, wherein the data communication system is an RFID data communication system.

* * * * *

UNITED STATES PATENT AND TRADEMARK OFFICE
CERTIFICATE OF CORRECTION

| | | |
|---|---|---|
| PATENT NO. | : 8,111,672 B2 | Page 1 of 1 |
| APPLICATION NO. | : 11/105455 | |
| DATED | : February 7, 2012 | |
| INVENTOR(S) | : Ulrich Friedrich | |

It is certified that error appears in the above-identified patent and that said Letters Patent is hereby corrected as shown below:

In the Specification

Column 5, Line 66 after "control field" delete "in" and insert -- is --.

Signed and Sealed this
Fourteenth Day of October, 2014

Michelle K. Lee
*Deputy Director of the United States Patent and Trademark Office*